United States Patent
Kim et al.

(10) Patent No.: US 9,916,120 B2
(45) Date of Patent: Mar. 13, 2018

(54) METHOD AND APPARATUS FOR PROVIDING OF SCREEN MIRRORING SERVICE

(71) Applicant: SAMSUNG ELECTRONICS CO., LTD., Suwon-si, Gyeonggi-do (KR)

(72) Inventors: Tae-Hyung Kim, Yongin-si (KR); Kwang-Hyun Ko, Suwon-si (KR); Alexander Larionov, Suwon-si (KR); Yong-Ha Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

(21) Appl. No.: 15/045,485

(22) Filed: Feb. 17, 2016

(65) Prior Publication Data

US 2016/0239250 A1  Aug. 18, 2016

(30) Foreign Application Priority Data

Feb. 17, 2015  (KR) .................. 10-2015-0024514

(51) Int. Cl.
*G06F 3/14*  (2006.01)
(52) U.S. Cl.
CPC .......... *G06F 3/1431* (2013.01); *G06F 3/1454* (2013.01)
(58) Field of Classification Search
None
See application file for complete search history.

(56) References Cited

U.S. PATENT DOCUMENTS

| | | | | |
|---|---|---|---|---|
| 8,830,397 B2* | 9/2014 | Higashi | ............. | H04N 21/4126 348/552 |
| 8,831,191 B1* | 9/2014 | Vendrow | ........... | H04M 3/42042 379/142.01 |
| 2010/0246824 A1 | 9/2010 | Xiao et al. | | |
| 2015/0054852 A1* | 2/2015 | Ohnuma | ................ | G09G 5/14 345/635 |
| 2015/0194135 A1* | 7/2015 | Higashi | ............. | H04N 21/4126 345/2.2 |

FOREIGN PATENT DOCUMENTS

| KR | 10-2012-0001798 | 1/2012 |
|---|---|---|
| KR | 10-2014-0054742 | 5/2014 |
| KR | 10-1411569 | 6/2014 |

* cited by examiner

*Primary Examiner* — Joseph Haley
(74) *Attorney, Agent, or Firm* — Nixon & Vanderhye P.C.

(57) ABSTRACT

A method and an electronic device for providing a screen mirroring service are provided. The method includes connecting a control channel to at least one other electronic device when an electronic device executes a screen mirroring service, transmitting screen data comprising an added virtual key, to the other electronic device, and performing a function based on a control signal corresponding to using the virtual key received from the other electronic device over the control channel.

15 Claims, 14 Drawing Sheets

METHOD AND APPARATUS FOR PROVIDING OF SCREEN MIRRORING SERVICE

CROSS-REFERENCE TO RELATED APPLICATION

This application is based on and claims priority under 35 U.S.C. §119 to a Korean patent application filed in the Korean Intellectual Property Office on Feb. 17, 2015, and assigned Serial No. 10-2015-0024514, the disclosure of which is incorporated by reference herein in its entirety.

FIELD

The disclosure relates generally to a method and an apparatus for providing a screen mirroring service. For example, the disclosure relates to a method and an electronic device for providing a screen mirroring service s to control a source electronic device by a sync electronic device during screen mirroring.

BACKGROUND

Digital media services, such as videos or games, using a portable electronic device is drawing much attention recently. However, it is not easy for several users to concurrently use digital multimedia data because of screen size constraint of the portable electronic device. More portable electronic devices are released with a Television (TV) TV OUT function, such as screen mirroring, for outputting a digital multimedia signal to a bigger display such as a TV, a monitor, or a projector.

As such, in the screen mirroring, a sync electronic device cannot access a physical key of a source electronic device and thus a user needs to control the source electronic device in person.

The above information is presented as background information only to assist with an understanding of the disclosure. No determination has been made, and no assertion is made, as to whether any of the above might be applicable as prior art with regard to the disclosure.

SUMMARY

To address the above-discussed deficiencies, it is an aspect of the disclosure to provide an example method and an electronic device for providing a screen mirroring service allowing a sync electronic device to access a physical key of a source electronic device through a virtual key by transmitting the virtual key corresponding to the physical key of a source electronic device to the sync electronic device.

According to one aspect of the disclosure, a method for providing a screen mirroring service includes: connecting a control channel at least one other electronic device when an electronic device executes a screen mirroring service, transmitting screen data comprising an added virtual key to the other electronic device and performing a function corresponding to a control signal received from the other electronic device over the control channel.

According to another aspect of the disclosure, an electronic device for providing a screen mirroring service includes communication circuitry configured to connect a control channel between the electronic device and at least one other electronic device in a screen mirroring service, input circuitry including at least one physical key, a display for displaying screen data including an added virtual key corresponding to the physical key, and a controller configured to transmit the screen data displayed on the display to the at least one other electronic device and to perform a function corresponding to a control signal received from the other electronic device over the control channel.

According to another aspect of the disclosure, a computer-readable medium having recorded thereon a program which, when executed by a processor, connecting a control channel to at least one other electronic device when an electronic device executes a screen mirroring service, transmitting screen data comprising an added virtual key to the other electronic device, and performing a function corresponding to a control signal received from the other electronic device over the control channel.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features, and advantages of certain example embodiments of the disclosure will be more apparent from the following detailed description, taken in conjunction with the accompanying drawings, in which like reference numerals refer to like elements, and wherein.

Throughout the drawings, like reference numerals will be understood to refer to like parts, components and structures.

DETAILED DESCRIPTION

Figure 1:
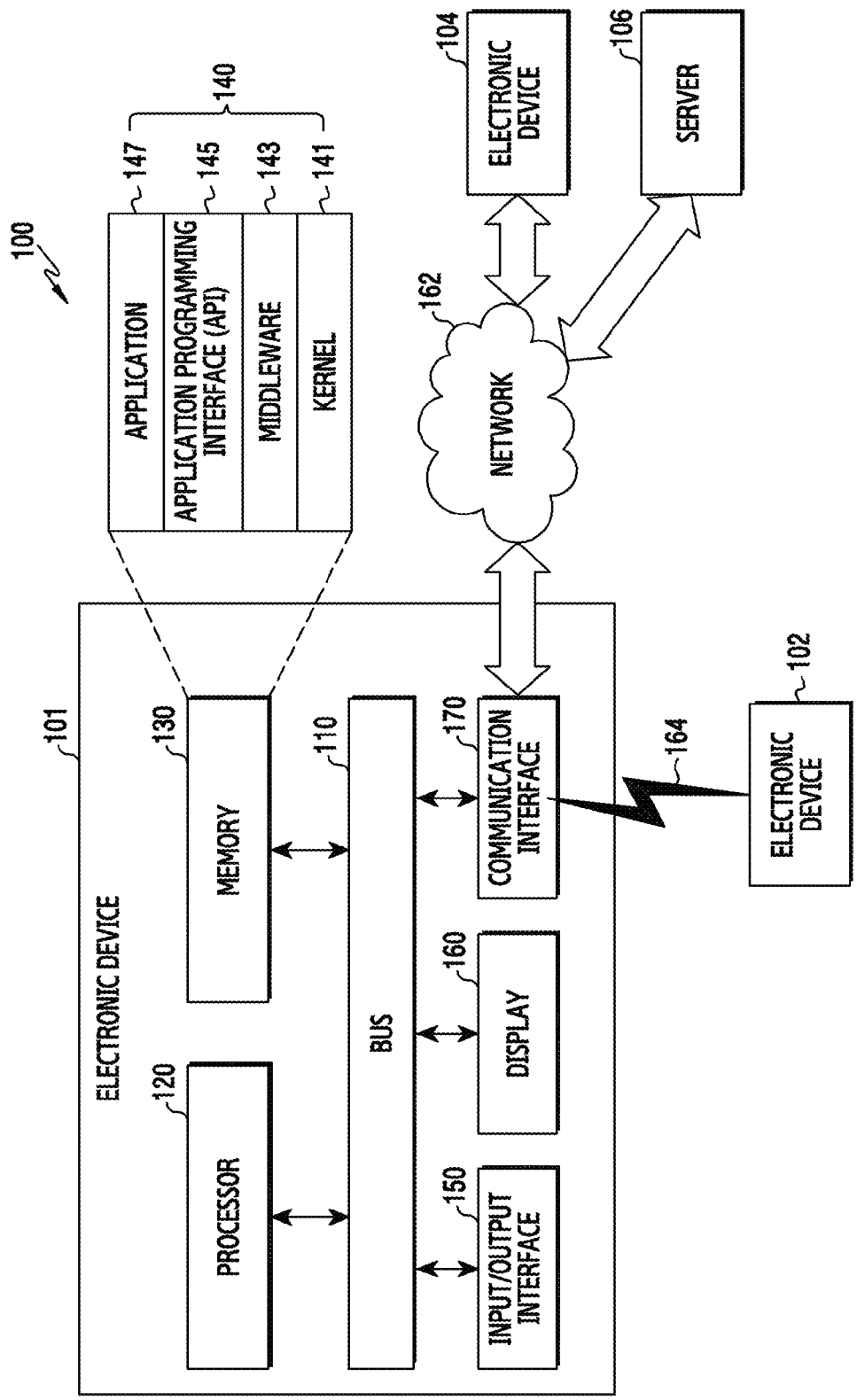
FIG. 1 is a diagram illustrating an example network including an electronic device.

Hereinafter, various examples of the disclosure will be described with reference to the accompanying drawings. However, it should be understood that there is no intent to limit the disclosure to the particular forms disclosed herein; rather, the disclosure should be construed to cover various modifications, equivalents, and/or alternatives of examples of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various examples of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. It may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer to a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

The terms used herein are merely for the purpose of describing particular examples and are not intended to limit the scope of other examples. As used herein, singular forms may include plural forms as well unless the context clearly indicates otherwise. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude examples of the disclosure.

An electronic device according to various examples of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like. According to various examples, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), etc.

According to some examples, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, etc.

According to another example, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like.

According to some examples, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various examples of the disclosure may be a combination of one or more of the aforementioned various devices. The electronic device according to some examples of the disclosure may be a flexible device. Further, the electronic device according to an example of the disclosure is not limited to the aforementioned devices, and may include a new electronic device according to the development of technology An electronic device according to various examples will be described with reference to the accompanying drawings. As used herein, the term "user" may indicate a person who uses an electronic device or a device (e.g., an artificial intelligence electronic device) that uses an electronic device.

An electronic device 101 within a network environment 100, according to various examples, will be described with reference to FIG. 1. The electronic device 101 may include a bus 110, a processor 120, a memory 130, an input/output interface 150, a display 160, and a communication interface 170. In some examples, the electronic device 101 may omit at least one of the above elements or may further include other elements.

The bus 110 may include, for example, a circuit for connecting the elements 110-170 and for communication (e.g., control messages and/or data) between the elements.

The processor 120 may include, for example, one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include, for example, a volatile memory and/or a non-volatile memory. The memory 130 may store, for example, instructions or data relevant to at least one other element of the electronic device 101. According to an example, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may, for example, control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 based on priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 may refer to an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may be configured to perform communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol, or the like. In addition, the wireless communication may include, for example, short range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS), or the like. The network 162 may include at least one of a communication network such as a computer network (e.g., a LAN or a WAN), the Internet, and a telephone network, etc.

Each of the first and second external electronic apparatuses 102 and 104 may be of a type identical to or different from that of the electronic apparatus 101. According to an example, the server 106 may include a group of one or more servers. According to various examples, all or some of the operations performed in the electronic device 101 may be performed in another electronic device or a plurality of electronic devices (e.g., the electronic devices 102 and 104 or the server 106). According to an example, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
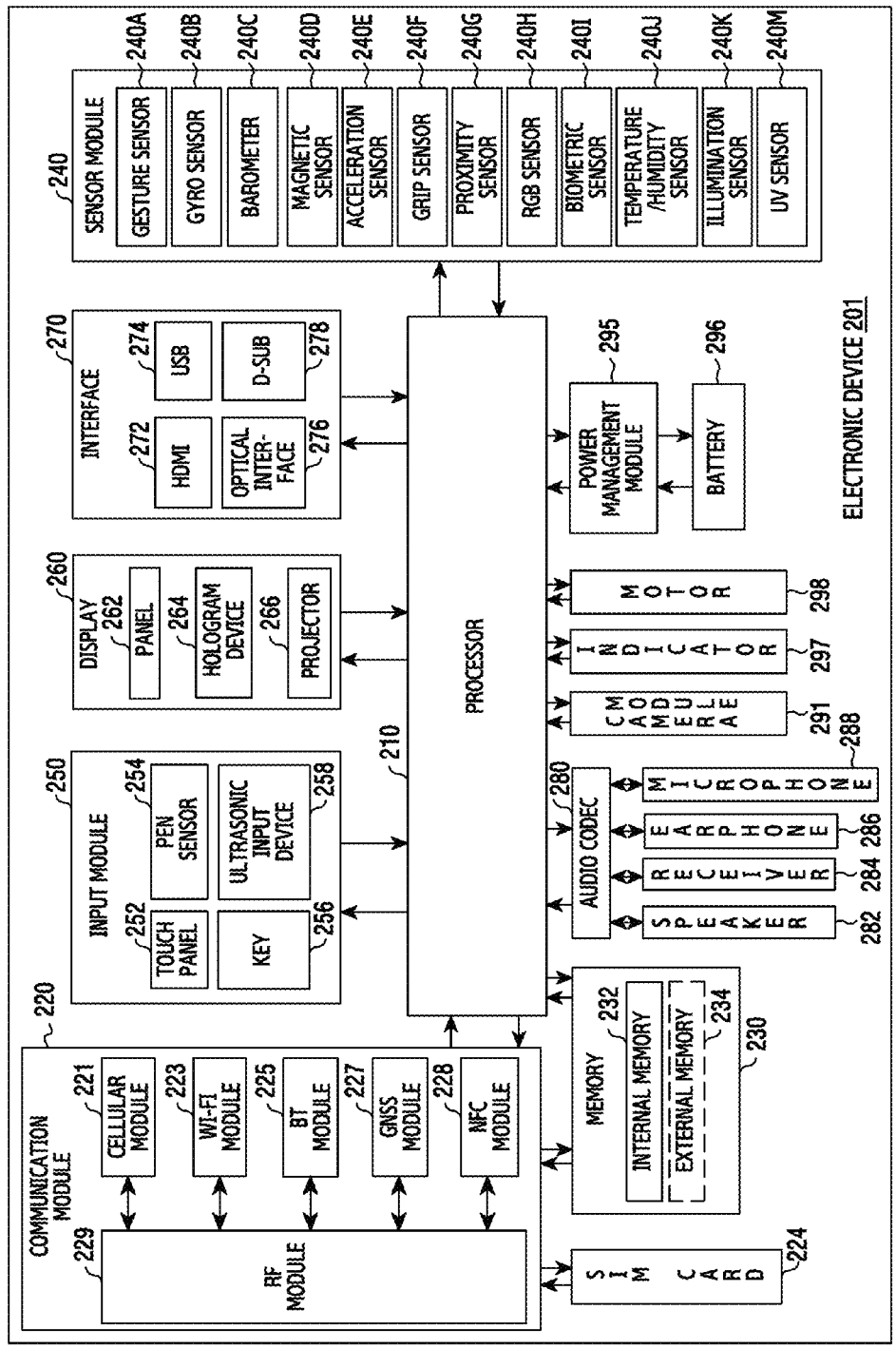
FIG. 2 is a block diagram illustrating an example electronic device.

FIG. 2 is a block diagram illustrating an example electronic device 201. For example, the electronic apparatus 201 may include the whole or part of the electronic apparatus 101 illustrated in FIG. 1. The electronic device 201 may include at least one processor (e.g., Application Processor (AP)) 210, a communication module (e.g., including communication circuitry) 220, a Subscriber Identification Module (SIM) 224, a memory 230, a sensor module (e.g., including sensors and/or sensor circuitry) 240, an input module (e.g., including input circuitry) 250, a display 260, an interface 270, an audio module (e.g., including a codec) 280, a camera module 291, a power management module 295, a battery 296, an indicator 297, and a motor 298.

The processor 210 may be configured to control a plurality of hardware or software components connected to the processor 210 by executing an operating system or an application program and perform processing of various pieces of data and calculations. The processor 210 may be implemented by, for example, a System on Chip (SoC). According to an example, the processor 210 may further include a Graphic Processing Unit (GPU) and/or an image signal processor (not shown). The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration that is the same as or similar to that of the communication interface 170 of FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229, etc.

The cellular module 221 may provide, for example, a voice call, image call, a text message service, or an Internet service through, for example, a communication network. According to an example, the cellular module 221 may distinguish between and authenticate electronic devices 201 within a communication network using a subscriber identification module (for example, the SIM card 224). According to an example of the disclosure, the cellular module 221 may perform at least some of the functions that the processor 210 may provide. According to an example, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some examples of the disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another example of the disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130 of FIG. 1) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may include circuitry and/or sensors that measure a physical quantity or detect an operation state of the electronic device 201, and may convert the measured or detected information into an electrical signal. For example, the sensor module 240 may include at least one of a gesture sensor 240A, a gyro sensor 240B, a barometer 240C, a magnetic sensor 240D, an acceleration sensor 240E, a grip sensor 240F, a proximity sensor 240G, a color sensor 240H (for example, a Red/Green/Blue (RGB) sensor), a biometric sensor 240I, a temperature/humidity sensor 240J, an illumination sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit configured to control one or more sensors included therein. In some examples of the disclosure, the electronic apparatus 201 may further include a processor configured to control the sensor module 240 as a part of or separately from the processor 210, and may be configured to control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type, or the like. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264 and/or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an example, the display 260 may further include a control circuit configured to control the panel 262, the hologram device 264, or the projector 266.

The interface 270 may include, for example, a High-Definition Multimedia Interface (HDMI) 272, a Universal Serial Bus (USB) 274, an optical interface 276, and/or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface, or the like.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 may refer to a device which may photograph a still image and a dynamic image. According to an example, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an example, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the disclosure may be configured with one or more components, and the names of the corresponding component elements may vary based on the type of electronic device. The electronic device according to various examples of the disclosure may include at least one of the aforementioned elements. Some elements may be omitted or other additional elements may be further included in the electronic device. Also, some of the hardware components according to various examples may be combined into one entity, which may perform functions identical to those of the relevant components before the combination.

Figure 3:
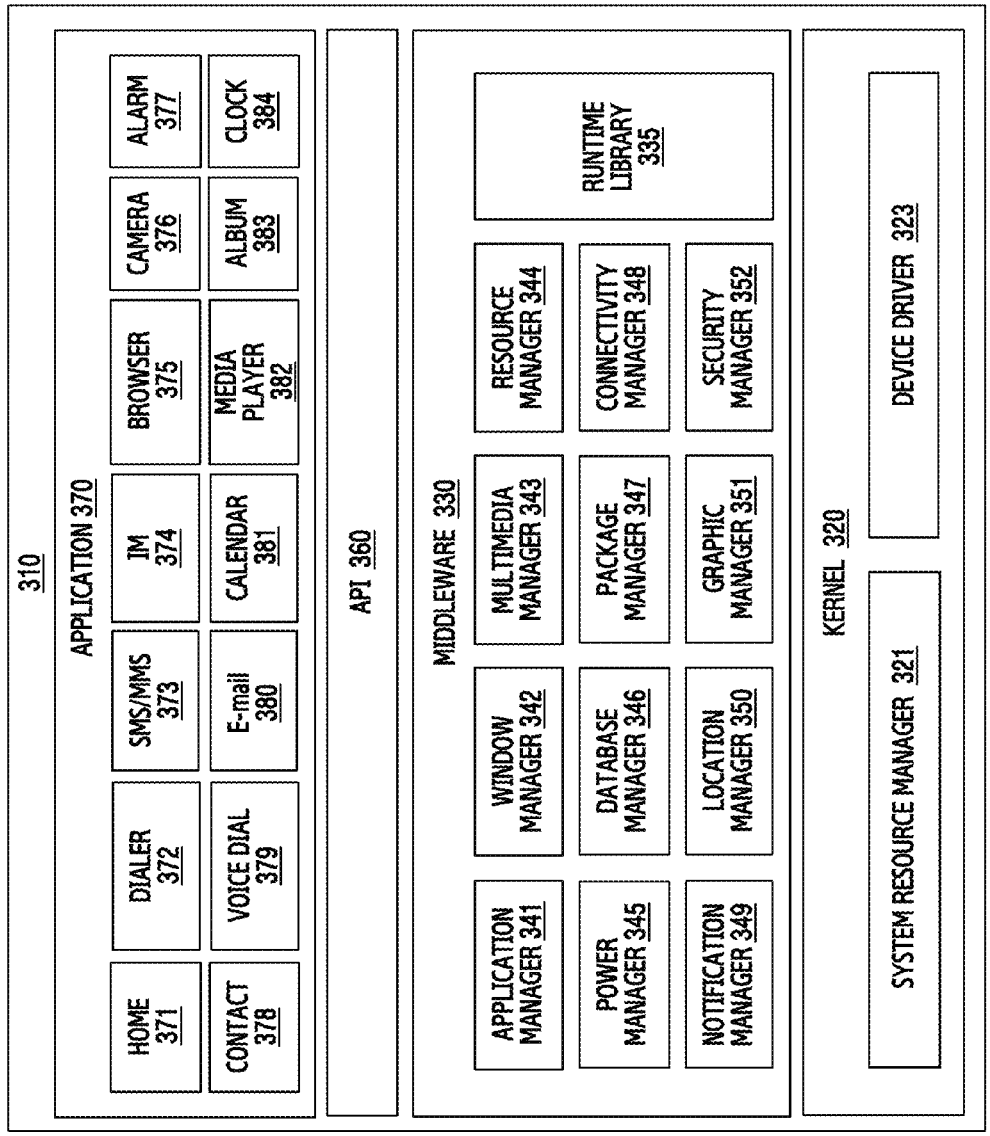
FIG. 3 is a block diagram illustrating an example program module.

FIG. 3 is a block diagram illustrating an example program module. According to an example, the program module 310 (for example, the program 140 of FIG. 1) may include an Operating System (OS) for controlling resources related to the electronic device (for example, the electronic device 101) and/or various applications (for example, the application programs 147 of FIG. 1) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106 of FIG. 1).

The kernel 320 (e.g., the kernel 141 of FIG. 1) may include, for example, a system resource manager 321 and/or a device driver 323. The system resource manager 321 may perform the control, allocation, retrieval, or the like of system resources. According to an example of the disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an example, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an example of the disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145 of FIG. 1) may, for example, refer to a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147 of FIG. 1) may include, for example, one or more applications which can provide functions such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384, health care (for example, measure exercise quantity or blood sugar), or environment information (for example, atmospheric pressure, humidity, or temperature information) (not shown).

According to an example of the disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an example, the applications 370 may include applications (for example, a health care application of a mobile medical appliance or the like) designated based on attributes of the external electronic device 102 or 104. According to an example of the disclosure, the application 370 may include an application received from the external electronic apparatus (e.g., the server 106, or the electronic apparatus 102 or 104). According to an example of the disclosure, the application 370 may include a preloaded application or a third party application which can be downloaded from the server. Names of the elements of the program module 310, according to the above-described examples of the disclosure, may change depending on the type of OS.

According to various examples of the disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including at least one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various examples, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Figure 4:
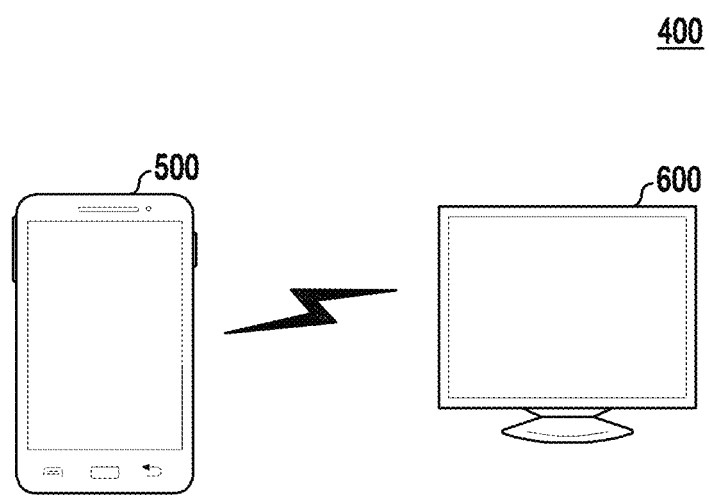
FIG. 4 is a diagram illustrating an example screen mirroring service providing system.

FIG. 4 illustrates an example screen mirroring service providing system 400.

Referring to FIG. 4, the screen mirroring service providing system 400 may, for example, include a first electronic device (hereafter, referred to as a source electronic device) 500 and a second electronic device (hereafter, referred to as a sync electronic device) 600.

The source electronic device 500 and the sync electronic device 600 may, for example, be connected using at least one wired or wireless communication method. The source electronic device 500 and the sync electronic device 600 can adopt a communication method for transmitting screen data displayed on the source electronic device 500, to the sync electronic device 600, for example, Miracast.

The source electronic device 500 may continuously transmit its displayed screen data to the sync electronic device 600, and the sync electronic device 600 can display the screen data received from the source electronic device 500.

The source electronic device 500 may, for example, be an electronic device including a smart phone, a tablet, and a wearable device such as a smart watch, or the like. The sync electronic device 600 may, for example, be an electronic device such as a smart phone, a tablet, a television, or a monitor, or the like, capable of communicating with the source electronic device 500. When the sync electronic device 600 cannot directly communicate with the source electronic device 600, an external device for communicating with the source electronic device 500, for example, a dongle, can be connected to the sync electronic device 500 to thus communicate with the source electronic device 500.

To identify whether the sync electronic device 600 uses a control channel, the source electronic device 500 can request the sync electronic device 600 to identify the control channel. The control channel may, for example, refer to a channel allowing the sync electronic device 600 to control the source electronic device 500. For example, when the source electronic device 500 and the sync electronic device 600 use Miracast communication, the control channel can include User Input Back Channel (UIBC).

When the control channel is available, the sync electronic device 600 can transmit its related message to the source electronic device 500. When the sync electronic device 600 can use the control channel, the sync electronic device 600 may transmit a control signal of, for example, a user input to the source electronic device 500 over the control channel. For example, the control signal can include a signal for activating a virtual key corresponding to at least one physical key of the source electronic device 500, a move signal issued when the virtual key added to the screen data is moved, and a manipulation signal for controlling the source electronic device 500.

When the control signal received from the sync electronic device 600 is to activate the virtual key, the source electronic device 500 can add the virtual key corresponding to at least one physical key of the source electronic device 500, to the screen data. The source electronic device 500 can transmit the screen data including the added virtual key to the sync electronic device 600. For example, the physical key can be disposed in a region excluding a display unit in the source electronic device 500, and can be implemented using a key pad, a dome switch, a button, a touch panel, and a jog & shuttle, for receiving an input.

The sync electronic device 600 can display the screen data received from the source electronic device 500. The sync electronic device 600 can transmit a control signal issued by the user to the source electronic device 500. The source electronic device 500 can perform a function corresponding to the control signal received from the sync electronic device 600. The source electronic device 500 can display the screen data corresponding to the function and transmit the displayed screen data to the sync electronic device 600.

Figure 5:
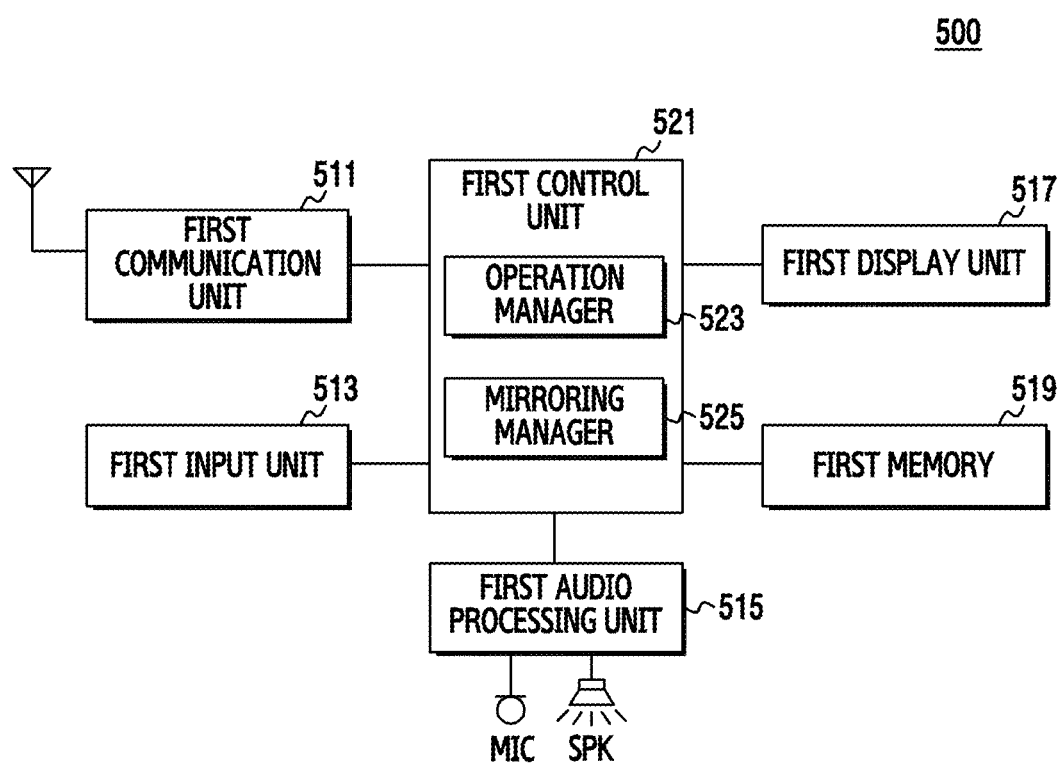
FIG. 5 is a block diagram illustrating an example source electronic device for providing a screen mirroring service.

FIG. 5 is a block diagram illustrating an example source electronic device 500 for providing a screen mirroring service.

Referring to FIG. 5, the source electronic device 500 may, for example, include a first communication unit (e.g., including communication circuitry) 511, a first input unit (e.g., including input circuitry) 513, a first audio processing unit (e.g., including an audio processor) 515, a first display unit (e.g., including a display) 517, a first memory 519, and a first control unit (e.g., including a controller, processor or processing circuitry) 521.

The first communication unit 511 may be configured to process communication of the source electronic device 500. The first communication unit 511 may be configured to communicate with an external device (not shown) using various communication methods. The first communication unit 511 may be configured to perform at least one of wireless communication and wired communication. For doing so, the first communication unit 511 may be configured to access at least one of a mobile communication network and a data communication network. The first communication unit 511 may be configured to conduct short-range communication. For example, the external device can include the sync electronic device 600, a base station, a server, and a satellite. The communication methods can include Miracast, LTE, WCDMA, GSM, WiFi, Bluetooth, and NFC, or the like.

The first input unit 513 may be configured to generate input data in response to, for example, the user input of the source electronic device 500. The first input unit 513 can include at least one input. The first input unit 513 can include, for example, a physical key such as a key pad, a dome switch, a button, a touch panel, and a jog & shuttle, or the like.

The first audio processing unit 515 may be configured to process an audio signal. The first audio processing unit 515 can include a speaker (SPK) and a microphone (MIC). The first audio processing unit 515 can play an audio signal output from the first control unit 521, through the speaker. The first audio processing unit 515 can forward an audio signal generated from the microphone, to the first control unit 521.

The first display unit 517 may be configured to display the screen data based on an operation of the source electronic device 500. The first display unit 517 may be configured to display the screen data including the added virtual key corresponding to the physical key, under control of the first control unit 521. The first display unit 517 can include, for example, an LCD display, an LED display, an OLED display, a Micro Electro Mechanical Systems (MEMS) display, and an electronic paper display, or the like. The first display unit 517 can include a plurality of light emitting elements. The first display unit 517 can be combined with the first input unit 513 and constructed as a touch screen.

The first memory 519 can store operation programs of the source electronic device 500. The first memory 519 can store the virtual key corresponding to the physical key formed, for example, on an outer side of the source electronic device 500, for example, a key pad, a dome switch, a button, a touch panel, and a jog & shuttle, or the like. The virtual key can be assigned a key value corresponding to the physical key.

The first control unit 521 may be configured to transmit the screen data displayed on the first display unit 517 to the sync electronic device 600, and to execute the function corresponding to the control signal received from the sync electronic device 600 over the control channel. For doing so, the first control unit 521 may, for example, include an operation manager 523 and a mirroring manager 525.

The operation manager 523 may be configured to display screen data based on a current operation of the source electronic device 500, on the first display unit 517. For example, the first display unit 517 can display an idle screen, still image data, video data, game data, and screen data, or the like, based on an application being executed.

When receiving from the first input unit 513 a screen mirroring execution signal for connecting screen mirroring to the sync electronic device 600, the mirroring manager 525 may be configured to scan at least one sync electronic device 600 for mirroring the screen with the source electronic device 500. The mirroring manager 525 may be configured to display a list of the at least one sync electronic device 600 scanned, on the first display unit 517. When receiving a selection signal of the sync electronic device 600 in, for example, the list from the first input unit 513, the mirroring manager 525 may be configured to request the selected sync electronic device 600 to identify the control channel. When requesting to identify the control channel of the sync electronic device 600, the mirroring manager 525 may be configured to determine, for example, an aspect ratio supported by the first display unit 517 and the display unit of the sync electronic device 600.

When receiving no message about control channel availability from the sync electronic device 600, the mirroring manager 525 may be configured to connect a transmit channel to the sync electronic device 600. When receiving a message indicating that the control channel is available from the sync electronic device 600, the mirroring manager 525 may be configured to connect the control channel and the transmit channel to the sync electronic device 600.

When receiving a screen mirroring end signal from the first input unit 513 or when receiving a screen mirroring end signal from the sync electronic device 600 over the control channel, the mirroring manager 525 may be configured to terminate the screen mirroring with the sync electronic device 600.

The operation manager 523 may be configured to transmit the screen data displayed on the first display unit 517, to the sync electronic device 600 over the transmit channel. A sync electronic device 600, which cannot use the control channel, cannot transmit the control signal to the source electronic device 500 and can merely display the screen data delivered from the source electronic device 500 to the sync electronic device 600. A sync electronic device 600, which can use the control channel, may be configured to transmit its control signal to the source electronic device 500 and thus control the source electronic device 500. The operations of the sync electronic device 600 which may be configured to use the control channel are explained in greater detail below.

The operation manager 523 may be configured to transmit the screen data based on the operation of the source electronic device 500, to the sync electronic device 600. When receiving the control signal from the sync electronic device 600 over the control channel, the operation manager 523 may be configured to determine whether the received control signal is, for example, the virtual key activation signal.

When the received control signal is the virtual key activation signal, the operation manager 523 may be configured to add the virtual key to the screen data displayed on the first display unit 517. The operation manager 523 may be configured to transmit the screen data including the added virtual key to the sync electronic device 600.

When the received control signal is, for example, a move signal based on the movement of the virtual key added to the screen data, the operation manager 523 may be configured to move the virtual key added to the screen data, based on a coordinate value of the virtual key of the move signal. The operation manager 523 may be configured to transmit the screen data including the moved virtual key, to the sync electronic device 600.

When the received control signal is, for example, a manipulation signal for controlling the source electronic device 500, the operation manager 523 may be configured to perform a function corresponding to the manipulation signal. The operation manager 523 may be configured to transmit the screen data which changes based on the operation of the source electronic device 500, to the sync electronic device 600. The manipulation signal can include, for example, a signal for viewing a menu, a signal for displaying a home screen, a signal for returning to a previous screen, a signal for controlling volume up/down, and a signal for executing a particular application, or the like, by use of the virtual key.

When adding the virtual key to the screen data displayed on the first display unit 517 and not receiving a control signal from the sync electronic device 600 during a threshold time, the operation manager 523 may be configured to remove the virtual key from the screen data. The operation manager 523 may be configured to transmit the screen data without the virtual key, to the sync electronic device 600.

An apparatus for providing the screen mirroring service may include a first communication unit 511 for connecting the control channel to at least one sync electronic device 600 when the screen mirroring service is executed, a first input unit including at least physical key, a first display unit 517 for displaying the screen data including the added virtual key corresponding to the physical key, and the first control unit 521 for transmitting the screen data displayed on the first display unit 517 to the sync electronic device 600 and performing the function corresponding to the control signal received from the sync electronic device 600 over the control channel.

The first control unit 521 may be configured to add the virtual key to the screen data displayed on the first display unit 517 if the control signal is to activate the virtual key. The first control unit 521 may be configured to change the location of the virtual key based, for example, on a move signal if the control signal is a move signal for moving the virtual key. The first control unit 521 may be configured to perform a function corresponding to a manipulation signal if the control signal is the manipulation signal.

The first control unit 521 may be configured to remove the virtual key if a control signal of the virtual key is not received during a threshold time.

The first control unit 521 may be configured to transmit the aspect ratio of the first display unit 517 to the sync electronic device 600.

Figure 6:
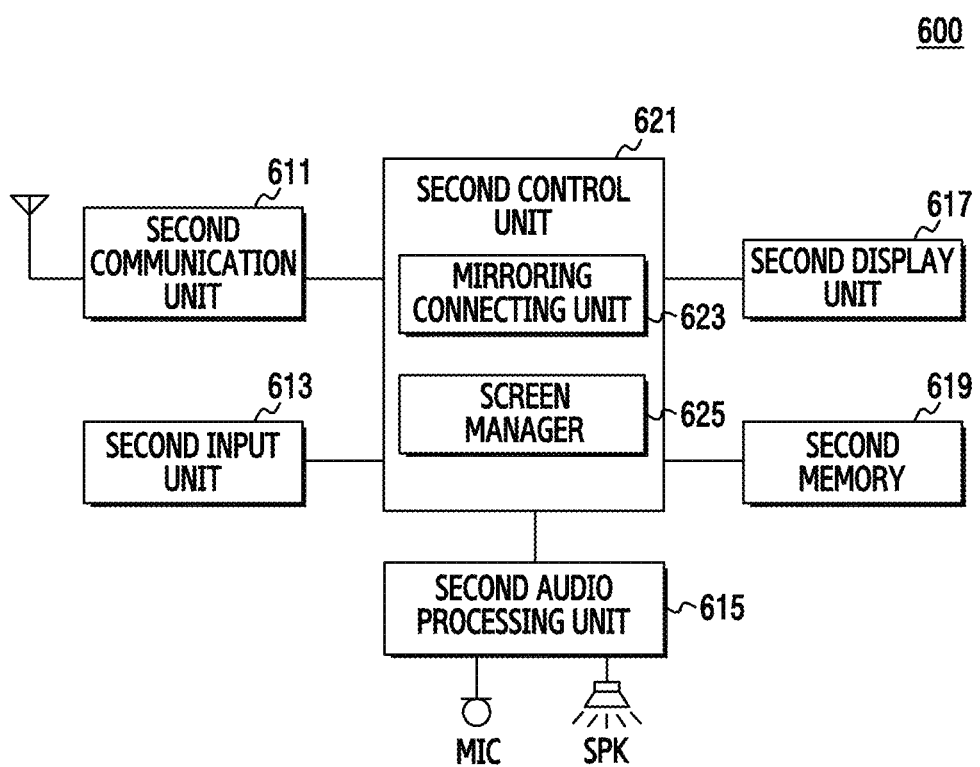
FIG. 6 is a block diagram illustrating an example sync electronic device for providing a screen mirroring service.

FIG. 6 is a block diagram illustrating an example sync electronic device 600 for providing a screen mirroring service.

Referring to FIG. 6, the sync electronic device 600 may, for example, include a second communication unit (e.g., including communication circuitry) 611, a second input unit (e.g., including input circuitry) 613, a second audio processor (e.g., including processing circuitry) 615, a second display unit (e.g., including a display) 617, a second memory 619, and a second control unit (e.g., including a controller, processor, processing circuitry, or the like) 621.

The second communication unit 611 may be configured to process communication of the sync electronic device 600. The second communication unit 611 may be configured to communicate with an external device (not shown) using various communication methods. The second communication unit 611 may be configured to perform at least one of the wireless communication and the wired communication. For doing so, the second communication unit 611 may access at least one of the mobile communication network and the data communication network. The second communication unit 611 may be configured to conduct the short-range communication. For example, the external device can include the source electronic device 500, a base station, a server, and a satellite. The communication methods can include Miracast, LTE, WCDMA, GSM, WiFi, Bluetooth, and NFC, etc.

The second input unit 613 may be configured to generate input data in response to an input of the sync electronic device 600. The second input unit 613 may be configured to include at least one input. The second input unit 613 may include a keyboard, a mouse, a remote control, a key pad, a dome switch, a button, a touch panel, and a jog & shuttle, or the like.

The second audio processing unit 615 may be configured to process an audio signal. The second audio processing unit 615 may include a speaker (SPK) and a microphone (MIC). The second audio processing unit 615 may be configured to play an audio signal output from the second control unit 621, through the speaker. The second audio processing unit 615 may be configured to forward an audio signal generated from the microphone, to the second control unit 621.

The second display unit 617 may display the screen data received from the source electronic device 500. The second display unit 617 may, for example, include an LCD display, an LED display, an OLED display, a MEMS display, and an electronic paper display, or the like. The second display unit 617 may include a plurality of light emitting elements. The second display unit 617 may be combined with the second input unit 613 and constructed as a touch screen.

The second memory 619 may store operation programs of the sync electronic device 600. For example, the second memory 619 may store a program for controlling the sync electronic device 600 based on the input of the second input unit 613.

The second control unit 621 may be configured to conduct screen mirroring with the source electronic device 500 and to display the screen data received from the source electronic device 500 on the second display unit 617. The second control unit 621 may be configured to transmit the control signal input through the second input unit 613 to the source electronic device 500. For doing so, the second control unit 621 may include a mirroring connector 623 and a screen manager 625.

When receiving from the source electronic device 500 a request for identifying whether the control channel is used, the mirroring connector 623 may be configured to determine whether the control channel is available. When the control channel is available, the mirroring connector 623 may be configured to transmit a message indicating the control channel available, to the source electronic device 500.

When receiving the screen mirroring end signal from the second input unit 613 or the source electronic device 500 during the screen mirroring, the mirroring connector 623 may be configured to terminate the screen mirroring with the source electronic device 500.

Depending on whether the control channel is used, the screen manager 625 may be configured to perform different functions in the screen mirroring with the source electronic device 500. For example, when the sync electronic device 600 cannot use the control channel, the screen manager 625 can display the screen data received from the source electronic device 500 over the control channel, on the second display unit 617 but cannot transmit the control signal based on the input of the second input unit 613, to the source electronic device 500. When the sync electronic device 600 can use the control channel, the screen manager 625 can display the screen data received from the source electronic device 500 over the transmit channel, on the second display unit 617 and transmit the control signal based on the input of the second input unit 613, to the source electronic device 500 over the control channel.

The screen manager 625 may be configured to generate and transmit a control signal corresponding to the input of the second input unit 613, to the source electronic device 500. The control signal may include, for example, a virtual key activation signal for activating the virtual key, a move signal issued when the virtual key added to the screen data is moved, and a manipulation signal for controlling the source electronic device 500. The screen manager 625 may be configured to move the virtual key added to the screen data based on the input of the second input unit 613 and to transmit the move signal including the coordinate value of the moved virtual key to the source electronic device 500. The manipulation signal may, for example, include a signal for viewing a menu, a signal for displaying a home screen, a signal for returning to a previous screen, a signal for controlling volume up/down, and a signal for executing a particular application, by use of the virtual key, or the like.

Figure 7:
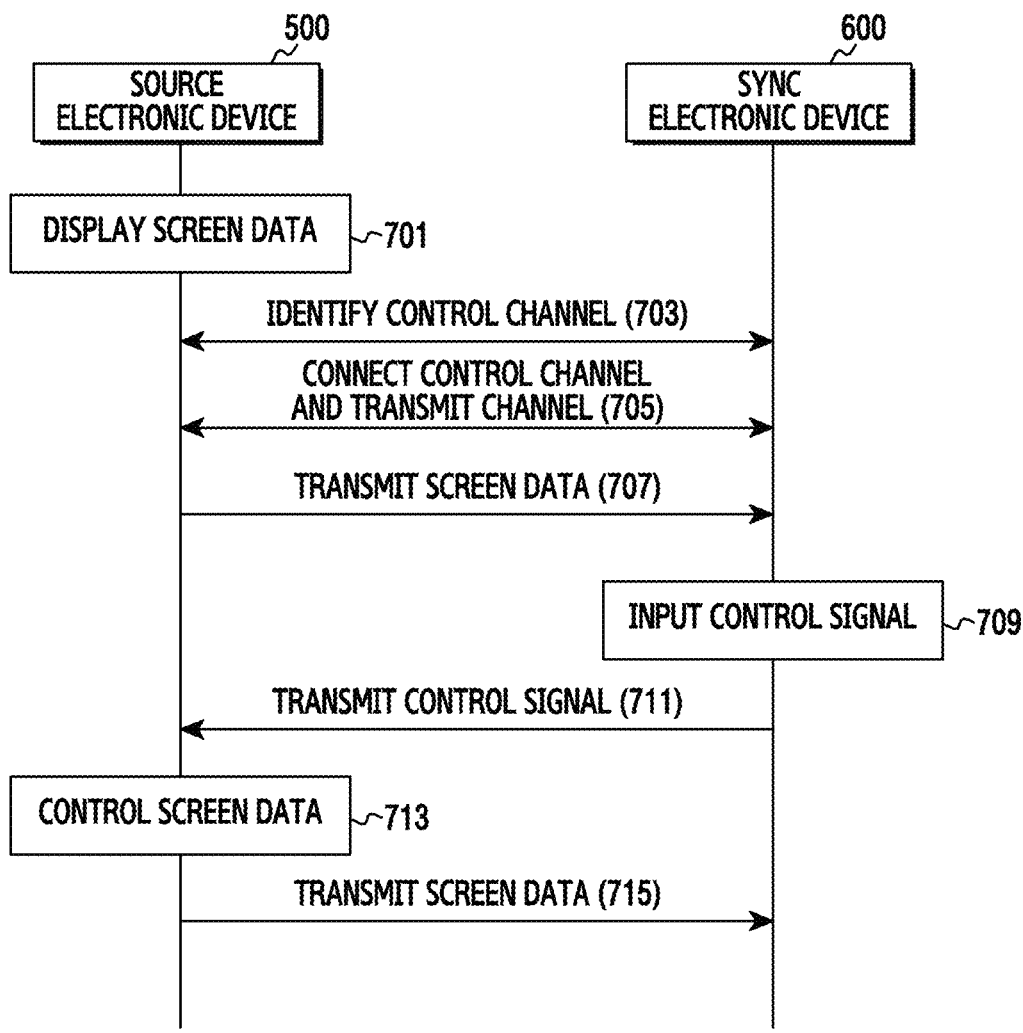
FIG. 7 is a flowchart illustrating an example method for providing a screen mirroring service.

FIG. 7 is a flowchart illustrating an example method for providing a screen mirroring service.

Referring to FIG. 7, the source electronic device 500 may be configured to display the screen data on the first display unit 517 in operation 701. In operation 703, the source electronic device 500 may be configured to determine whether the sync electronic device 600 to be connected for the screen mirroring can use the control channel. After determining the control channel of the sync electronic device 600 can use the control channel, the source electronic device 500 can confirm the aspect ratio supported by the first display unit 517 and the display unit of the sync electronic device 600. The control channel may refer to the channel of the sync electronic device 600 for controlling the source electronic device 500. When, for example, the source electronic device 500 and the sync electronic device 600 use Miracast communication, the control channel may include UIBC.

When the sync electronic device 600 can use the control channel, the source electronic device 500 can connect the control channel and the transmit channel to the sync electronic device 600 in operation 705. In operation 707, the source electronic device 500 may be configured to transmit the screen data displayed on the first display unit 517 to the sync electronic device 600. For example, the second display unit 617 of the sync electronic device 600 may be configured to display the screen data in the same aspect ratio as the aspect ratio of the screen data displayed on the first display unit 517. For example, the screen data displayed on the second display unit 617 of the sync electronic device 600 may correspond to the aspect ratio supported by the source electronic device 500 and the sync electronic device 600 as confirmed in response to the control channel identify request.

In operation 709, the sync electronic device 600 may display the screen data received from the source electronic device 500, on the second display unit 617. The sync electronic device 600 can receive the control signal from the second input unit 613. In operation 711, the sync electronic device 600 may be configured to transmit the input control signal to the source electronic device 500.

In operation 713, the source electronic device 500 may be configured to perform the function corresponding to the control signal received from the sync electronic device 600 and to control the screen data accordingly. In operation 715, the source electronic device 500 may be configured to display the controlled screen data on the first display unit 517 and to transmit the screen data to the sync electronic device 600. For example, when the control signal input in operation 709 is to activate the virtual key, the source electronic device 500 may be configured to add the virtual key corresponding to the physical key of the source electronic device 500, to the screen data. When the control signal input in operation 709 is, for example, the move signal for moving the virtual key added to the screen data, the source electronic device 500 can change the location of the virtual key displayed on the first display unit 517 based on the move signal. When the control signal input in operation 709 is the manipulation signal for controlling the source electronic device 500, the source electronic device 500 may be configured to control the screen data based on the manipulation signal.

Figure 8:
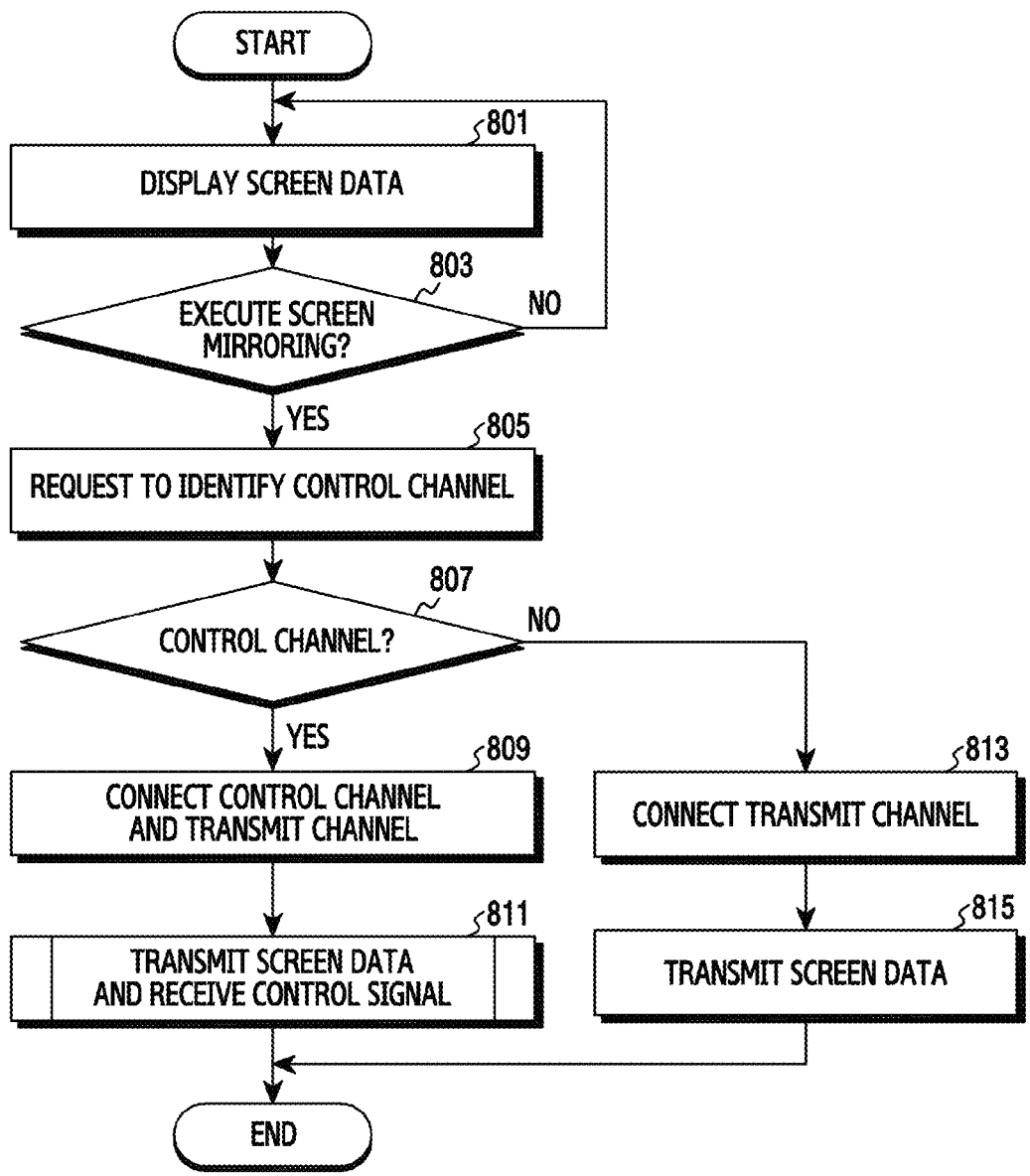
FIG. 8 is a flowchart illustrating an example method for executing a screen mirroring service with a sync electronic device in a source electronic device.

FIG. 8 is a flowchart illustrating an example method for executing a screen mirroring service with a sync electronic device 600 in a source electronic device 500.

Referring to FIG. 8, in operation 801, the first control unit 521 may be configured to display the screen data on the first display unit 517. The screen data may include, for example, an idle screen, still image data, video data, game data, and screen data, or the like, displayed on the first display unit 517 based on an application being executed.

When a screen mirroring execution signal of the sync electronic device 600 is received through the first input unit 513 in operation 803, the first control unit 521 may be configured to go to operation 805. When the screen mirroring execution signal is not received in operation 803, the first control unit 521 may be configured to return to operation 801 and wait to receive the screen mirroring execution signal.

In operation 805, the first control unit 521 may be configured to request at least one sync electronic device 600 capable of communicating with the source electronic device 500, to identify the control channel. For example, the first control unit 521 may be configured to scan at least one sync electronic device 600 within a screen mirroring distance. The first control unit 521 may be configured to display a list of the scanned sync electronic device(s) 600 on the first display unit 517. When receiving a signal for selecting at least one in the displayed list of the sync electronic device(s) 600 from the first input unit 513, the first control unit 521 may be configured to request to identify whether the sync electronic device 600 can use the control channel. The first control unit 521 may be configured to confirm the aspect ratio to be supported by the first display unit 517 and the second display unit 617 of the sync electronic device 600.

When receiving the message notifying that a control channel is available from the sync electronic device 600 in operation 807, the first control unit 521 may be configured to proceed to operation 809. When not receiving a message notifying that the control channel is available from the sync electronic device 600 in operation 807, the first control unit 521 may be configured to proceed to operation 813.

When not receiving the message notifying that the control channel is available from the sync electronic device 600 in response to the control channel identify request, the first control unit 521 may be configured to identify that the sync electronic device 600 cannot use the control channel. In operation 813, the first control unit 521 may be configured to connect the transmit channel to the sync electronic device 600. In operation 815, the first control unit 521 can transmit the screen data displayed on the first display unit 517 to the sync electronic device 600 over the transmit channel.

Figure 9:
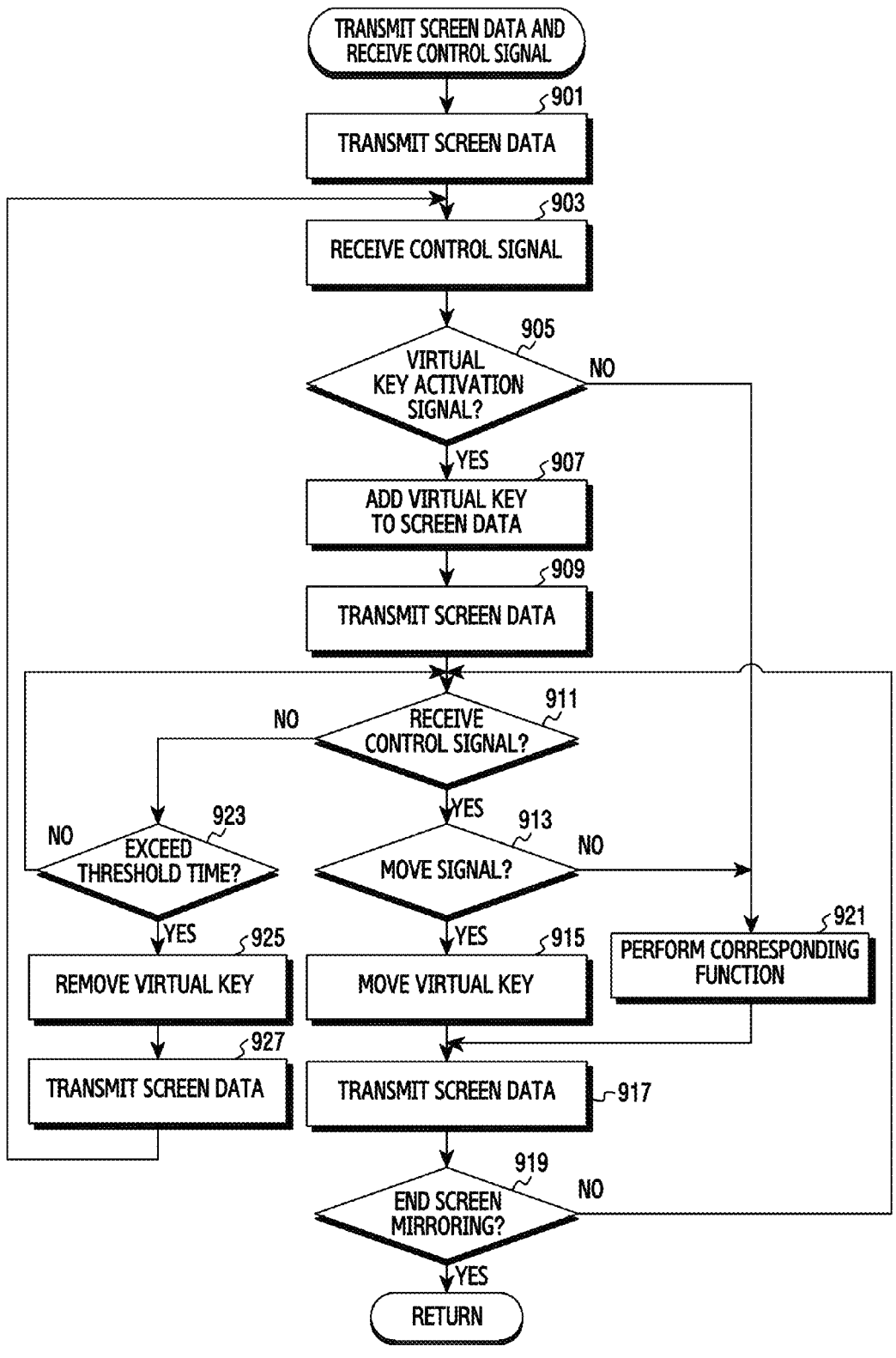
FIG. 9 is a flowchart illustrating an example method for transmitting screen data and receiving a control signal in a source electronic device.

Upon receiving the message notifying that the control channel is available from the sync electronic device 600, the first control unit 521 may be configured to connect the control channel and the transmit channel to the sync electronic device 600 in operation 809. In operation 811, the first control unit 521 may be configured to transmit the screen data to the sync electronic device 600 over the transmit channel and to receive the control signal from the sync electronic device 600 over the control channel. Referring now to FIG. 9, the operations of the first control unit 521 for transmitting the screen data to the sync electronic device 600 and for receiving the control signal from the sync electronic device 600 will be explained in greater detail below.

FIG. 9 is a flowchart illustrating an example method for transmitting screen data and receiving a control signal in a source electronic device 500.

Referring to FIG. 9, in operation 901, the first control unit 521 may be configured to transmit the screen data displayed on the first display unit 517 (e.g., as discussed above in operation 801), to the sync electronic device 600. The screen data transmitted to the sync electronic device 600 can be displayed on the second display unit 617.

When receiving a control signal from the sync electronic device 600 over the control channel in operation 903, the first control unit 521 goes to operation 905. When the received control signal is the virtual key activation signal in operation 905, the first control unit 521 goes to operation 907. When the received control signal is not the virtual key activation signal, the first control unit 521 goes to operation 921. In operation 921, the first control unit 521 may be configured to determine the received control signal as the manipulation signal and perform a function corresponding to the manipulation signal. In operation 917, the first control unit 512 may be configured to transmit the screen data to the sync electronic device 600 based on the function executed.

In operation 907, the first control unit 521 may be configured to add the virtual key to the screen data based on the virtual key activation key. The virtual key may, for example, correspond to the physical key formed on the outer side of the source electronic device 500, for example, a key pad, a dome switch, a button, a touch panel, and a jog & shuttle, or the like. The virtual key may be assigned a key value corresponding to the physical key. In operation 909, the first control unit 521 may be configured to transmit the screen data including the added virtual key to the sync electronic device 600.

When receiving the control signal from the sync electronic device 600 over the control channel in operation 911, the first control unit 521 proceeds to operation 913. When not receiving the control signal from the sync electronic device 600 over the control channel in operation 911, the first control unit 521 proceeds to operation 923. In operation 923, the first control unit 521 may be configured to determine whether the time for not receiving the control signal exceeds a threshold time. When receiving no control signal within the threshold time, the first control unit 521 goes to operation 925. In operation 925, the first control unit 521 may be configured to remove the virtual key from the screen data. In operation 927, the first control unit 521 may be configured to transmit the screen data without the virtual key, to the sync electronic device 600. When the time for not receiving the control signal does not exceed the threshold time in operation 923, the first control unit 521 may be configured to return to operation 911.

In operation 913, the first control unit 521 may be configured to determine whether the received control signal is a move signal issued by the movement of the virtual key added to the screen data. When the received control signal is the move signal in operation 913, the first control unit 521 goes to operation 915. When the received control signal is not the move signal in operation 913, the first control unit 521 goes to operation 921. In operation 921, the first control unit 521 may be configured to determine that the received control signal is the manipulation signal and thus perform the function corresponding to the manipulation signal in operation 917. In operation 917, the first control unit 521 may be configured to transmit the screen data which changes based on the function executed, to the sync electronic device 600. The manipulation signal can include a signal for viewing a menu, a signal for displaying a home screen, a signal for returning to a previous screen, a signal for controlling volume up/down, and a signal for executing a particular application, or the like, by use of the virtual key.

In operation 915, the first control unit 521 may be configured to change the location of the virtual key added to the screen data based on the move signal. The move signal may, for example, include the coordinate value of the changed location of the virtual key in the sync electronic device 600. The first control unit 521 may be configured to change the location of the virtual key added to the screen data based on the coordinate value of the received move signal in operation 917. In operation 917, the first control unit 521 may be configured to transmit the screen data including the changed virtual key location to the sync electronic device 600.

When receiving a screen mirroring end signal from the first input unit 513 in operation 919, the first control unit 521 can terminate the screen mirroring with the sync electronic device 600. When not receiving the screen mirroring end signal, the first control unit 521 may be configured to go back to operation 911. The first control unit 521 may be configured to terminate the screen mirroring with the sync electronic device 600 even when the screen mirroring end signal is received from the sync electronic device 600 over the control channel.

A method for providing a screen mirroring service may include connecting a control channel to at least one sync electronic device 600 when a source electronic device 500 executes a screen mirroring service, transmitting screen data including an added virtual key, to the sync electronic device 600, and performing a function corresponding to a control signal received from the sync electronic device 600. The virtual key may, for example, be a key corresponding to at least one physical key of the source electronic device 500.

The transmitting the screen data including the added virtual key to the sync electronic device 600 may comprise transmitting screen data displayed on the source electronic device 500, to the sync electronic device 600, receiving a control signal from the sync electronic device 600 over the control channel, and adding the virtual key to the screen data if the control signal is a signal for activating the virtual key.

The performing the function corresponding to the control signal may comprise, changing a location of the virtual key based on a move signal based on received the move signal for the virtual key.

The performing the function corresponding to the control signal may comprise, performing a function corresponding to a manipulation signal based on received the manipulation signal.

The method may further comprise, removing the virtual key if a control signal of the virtual key is not received during a threshold time.

The connecting the control channel to the at least one other electronic device may comprise transmitting an aspect ratio of the first display unit 517 of the source electronic device 500, to the sync electronic device 600.

The sync electronic device 600 may display, but is not limited to, the screen data received directly from the source electronic device 500, on the second display unit 617. For example, when the sync electronic device 600 is connected to a connector such as dongle for using the control channel, the sync electronic device 600 may receive the screen data from the source 500 through the connector and display the screen data on the second display 617.

FIGS. 10 through 14 depict example screens for connecting screen mirroring between a source electronic device 500 and a sync electronic device 600.

Figure 10:
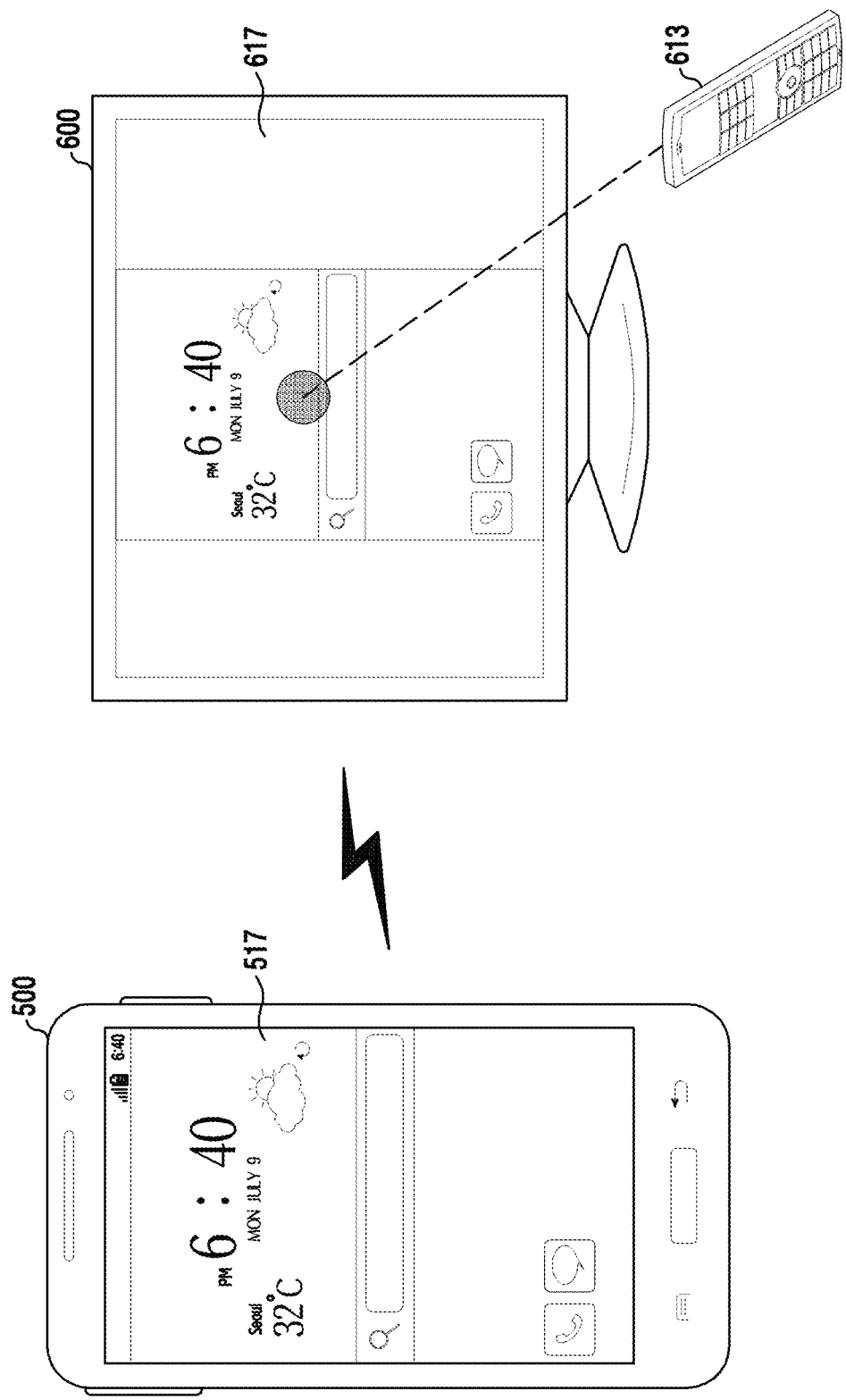
FIGS. 10 through 14 are diagrams illustrating example screens for connecting screen mirroring between a source electronic device and a sync electronic device.

Referring to FIGS. 10 through 14, when screen mirroring is initiated, the same screen data displayed on the first display unit 517 of the source electronic device 500 can be also displayed on the second display unit 617 of the sync electronic device 600. In so doing, the second display unit 617 may be configured to display the screen data of the first display unit 517 in the same aspect ratio as the first display unit 517. In response to an input to the second display unit 617 from the second input unit 613 as illustrated in FIG. 10, the second control unit 621 may be configured to generate and transmit a control signal corresponding to the input to the source electronic device 500.

Figure 11:
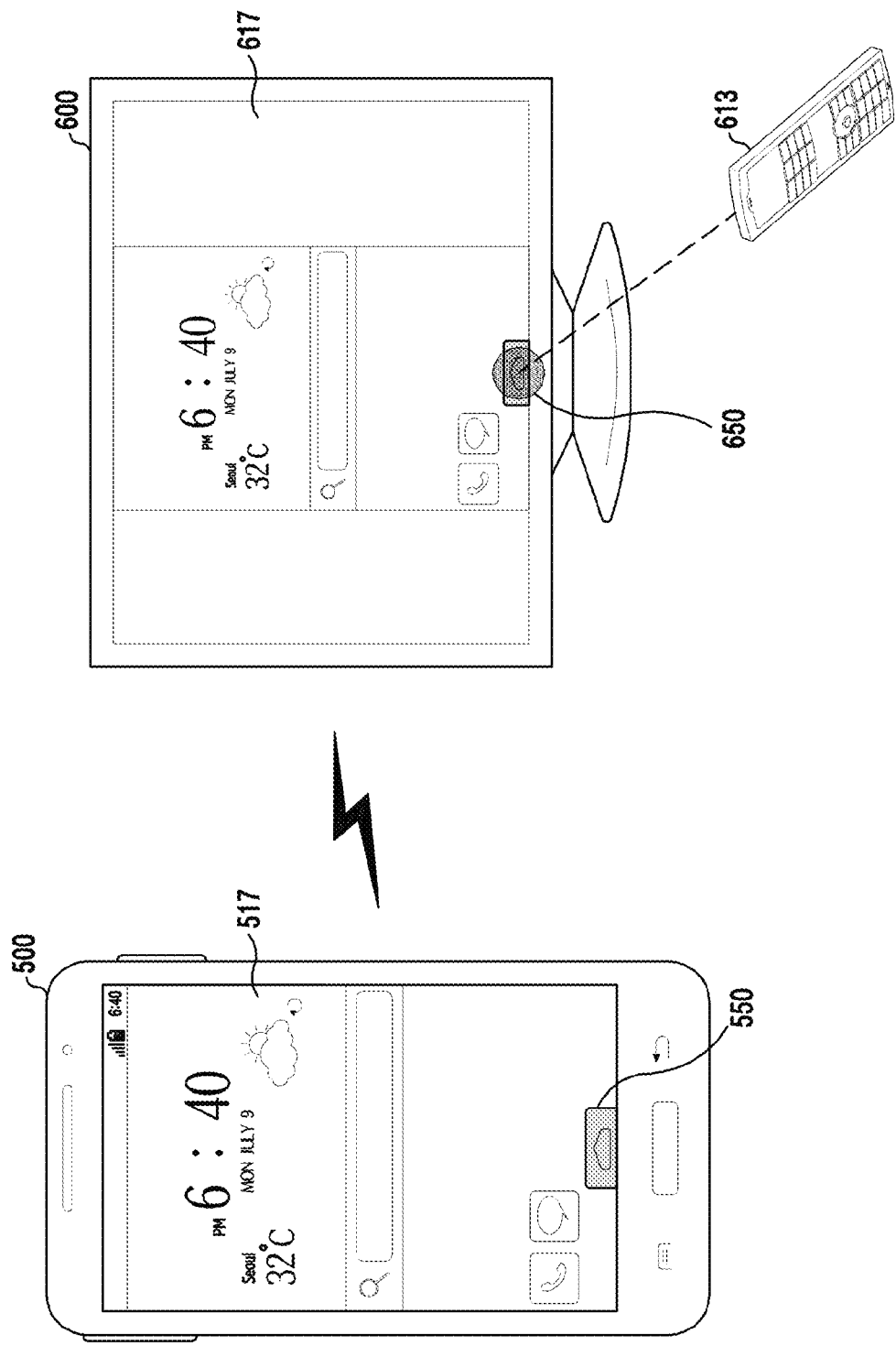

When the control signal received from the sync electronic device 600 is the virtual key activation signal, the source electronic device 500 may be configured to add a reduced virtual key 550 corresponding to the physical key of the source electronic device 500, to screen data on the first display unit 517 as illustrated in FIG. 11. The source electronic device 500 may be configured to transmit the screen data of the first display unit 517 to the sync electronic device 600. The second display unit 617 of the sync electronic device 600 may be configured to display the screen data including a virtual key 650. When the second input unit 613 points a specific point on the second display unit 617 over a threshold time or when the control signal is issued by inputting a particular pattern to the second display unit 617, the first control unit 521 may be configured to recognize the input as the virtual key activation signal.

When the second input unit 613 issues a control signal to the virtual key 650 as shown in FIG. 11, the second control unit 621 may be configured to transmit the control signal to the source electronic device 500.

Figure 12:
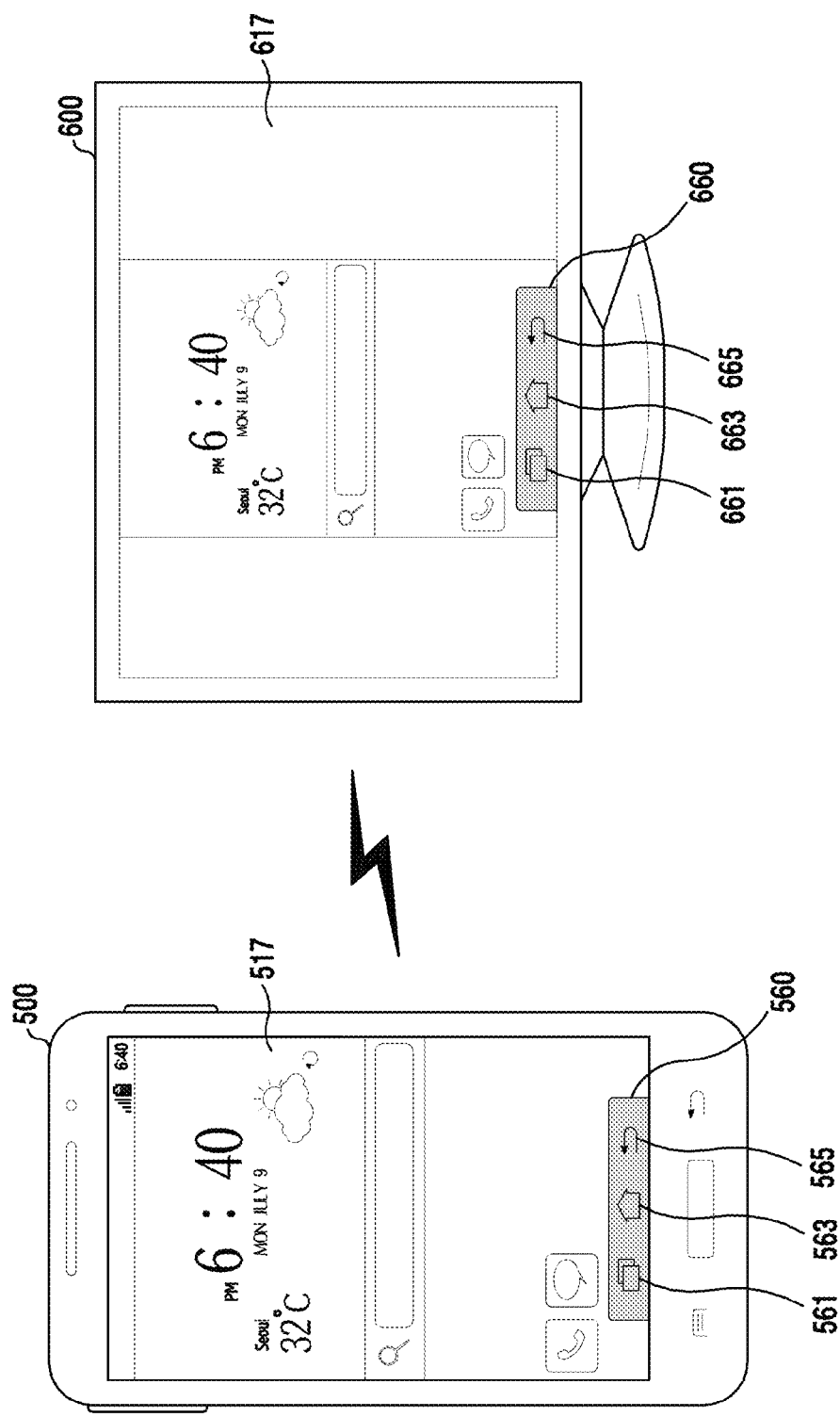

When the control signal to the virtual key 650 is, for example, to expand the virtual key 650, the first control unit 521 may be configured to expand the virtual key 550 of the first display unit 517 to a virtual key 560 as illustrated in FIG. 12. The source electronic device 500 may be configured to add the expanded virtual key 560 of the first display unit 517, to the screen data, and transmit the screen data to the sync electronic device 600. The second display unit 617 of the sync electronic device 600 may be configured to display the screen data of the first display unit 517. The expanded virtual key 560 and 660 may be assigned a key value corresponding to the physical key and may, for example, include a menu key 561 and 661, a home key 563 and 663, and a back key 565 and 665. While the virtual keys corresponding to the physical keys include, but are not limited to, the menu key, the home key, and the back key are displayed here, virtual keys corresponding to physical keys including, for example, a volume up/down key and a power key, or the like, of the source electronic device 500 may be displayed.

Figure 13:
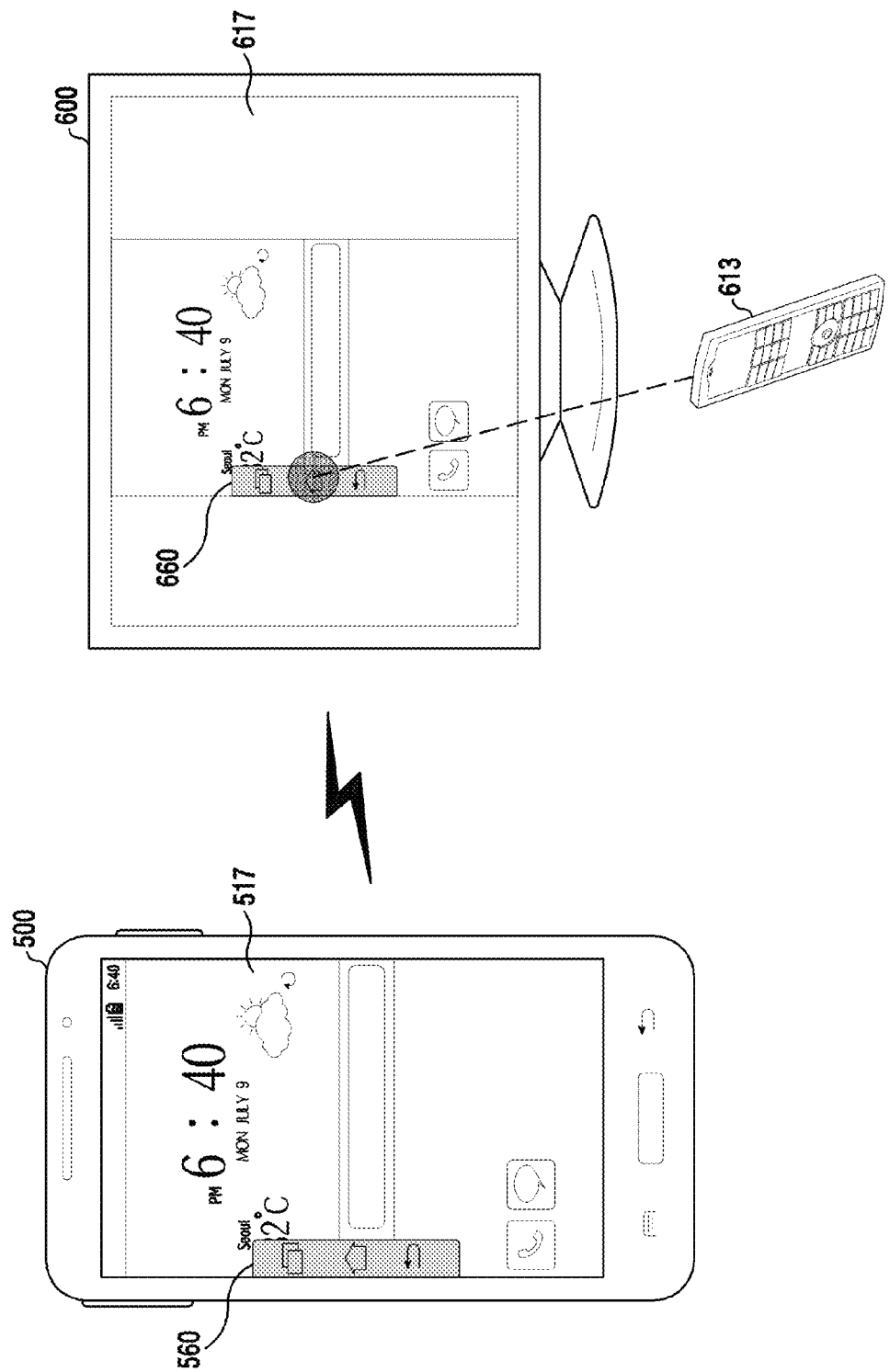

The second control unit 621 may be configured to move the expanded virtual key 660 based on the control signal input through the second input unit 613 of the sync electronic device 600, for example, the move signal of the virtual key as illustrated in FIG. 13. The sync electronic device 600 may be configured to transmit the move signal to the source electronic device 500 over the control channel. In so doing, the move signal may include, for example, the coordinate value of the virtual key 660. The source electronic device 500 may be configured to move the expanded virtual key 560 displayed on the first display unit 517, to the same or similar location on the second display unit 617 based on the movement coordinates of the expanded virtual key 660 received from the sync electronic device 600.

Figure 14:
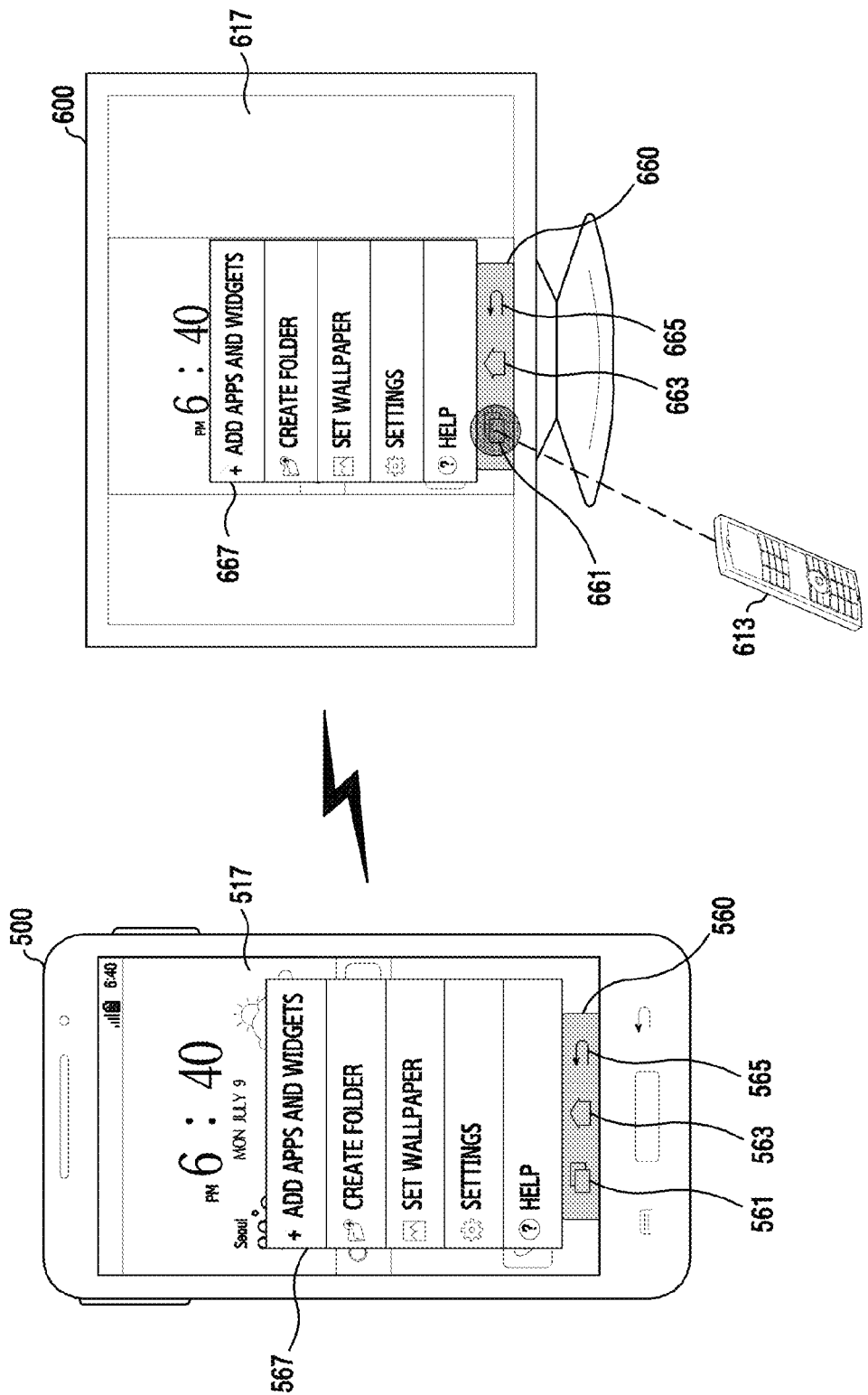

When detecting a control signal of the virtual key through the second input unit 613 of the sync electronic device 600, the second control unit 621 may be configured to provide the control signal to the source electronic device 500 as illustrated, for example, in FIG. 14. For example, when detecting a control signal for the menu key 661 of the virtual key 600, the second control unit 621 may be configured to transmit the control signal to the source electronic device 500. The source electronic device 500 may be configured to confirm coordinates corresponding to the control signal detected location and confirm a preset key value of the confirmed coordinates. Upon confirming the key value of the menu key, the source electronic device 500 may be configured to display the screen 567 corresponding to the menu key on the first display unit 517. The source electronic device 500 may be configured to transmit the screen 567 corresponding to the menu key, to the sync electronic device 600. The sync electronic device 600 may be configured to display screen data 667 corresponding to the menu key on the second display unit 617.

A non-transitory computer-readable recording medium may include magnetic media such as a hard disk, a floppy disk and a magnetic tape, an optical media (e.g., a Compact Disc Read Only Memory (CD-ROM) and a Digital Versatile Disc (DVD)), magneto-optical media (e.g., a floptical disk), and hardware devices (e.g., a Read Only Memory (ROM), a Random Access Memory (RAM), and a flash memory). A program instruction can include not only machine code made by a compiler but also high-level language code executable by a computer using an interpreter. The above-stated electronic device can serve as one or more software modules for fulfilling the operations of an example of the disclosure, and vice versa.

A recording medium for providing a screen mirroring service may include, for example, a computer-readable recording medium recording a program to execute operations which includes connecting a control channel to at least one sync electronic device 600 when a source electronic device 500 executes a screen mirroring service, transmitting screen data including an added virtual key, to the sync electronic device 600, and performing a function corresponding to a control signal received from the sync electronic device 600 over the control channel.

The module or the programming module according to an example of the disclosure may include at least one of the aforementioned components, omit some components, or further include other components. The operations fulfilled by the modules, the programming modules, or other components may be carried out in sequence, in parallel, repeatedly, or heuristically. In addition, some operations can be executed in a different order or omitted, or other operations may be added.

As set forth above, the method and the apparatus for providing the screen mirroring service may provide a virtual key corresponding to at least one physical key of the source electronic device to the sync electronic device. The sync electronic device can control the source electronic device using the virtual key in the screen mirroring and thus user convenience can be enhanced.

While the disclosure has been illustrated and described with reference to certain example embodiments thereof, it will be understood by those skilled in the art that various changes in form and details may be made without departing from the spirit and scope of the disclosure as defined by the appended claims and their equivalents.

What is claimed is:

1. A method in an electronic device for providing a screen mirroring service, the method comprising:
    connecting a control channel to at least one other electronic device;
    transmitting, to the at least one other electronic device, first screen data for displaying at least part of a screen of the electronic device at the at least one other electronic device;
    receiving, from the at least one other electronic device, a signal for activating a virtual key corresponding to a hardware key of the electronic device, via the control channel;
    in response to receiving the signal for activating the virtual key, transmitting, to the at least one other electronic device, second screen data comprising the virtual key; and
    performing a function corresponding to a control signal received from the at least one other electronic device via the control channel,
    wherein the virtual key is displayed at the electronic device while the virtual key is displayed at the at least one other electronic device.

2. The method of claim 1, wherein upon receiving, from the at least one other electronic device, a request for changing a configuration of the virtual key, third screen data comprising changed virtual key is transmitted to the at least one other electronic device.

3. The method of claim 2, wherein the transmitting the second screen data comprising the virtual key to the at least one other electronic device comprises:
    adding the virtual key to the first screen data if the signal for activating the virtual key is received.

4. The method of claim 2, wherein the performing the function corresponding to the control signal comprises:
    changing a location of the virtual key if the control signal is a move signal for moving the virtual key.

5. The method of claim 2, wherein the performing the function corresponding to the control signal comprises:
    performing the function corresponding to a manipulation signal if the control signal is the manipulation signal.

6. The method of claim 2, further comprising:
    removing the virtual key if a control signal of the virtual key is not received during a threshold time.

7. The method of claim 2, wherein the connecting the control channel to the at least one other electronic device comprises:
    transmitting an aspect ratio of a screen of the electronic device, to the at least one other electronic device.

8. An electronic device for providing a screen mirroring service, the electronic device comprising:
    communication circuitry configured to connect a control channel between the electronic device and at least one other electronic device;
    input circuitry comprising at least one hardware key;
    a display configured to display screen data; and
    a controller configured to:
        transmit, to the at least one other electronic device using the communication circuitry, first screen data for displaying at least part of a screen of the electronic device at the at least one other electronic device;
        receive, from the at least one other electronic device via the communication circuitry, a signal for activating a virtual key corresponding to the hardware key of the electronic device, via the control channel;

in response to receiving the signal, transmit, to the at least one other electronic device via the communication circuitry, second screen data comprising the virtual key;

perform a function corresponding to a control signal received from the at least one other electronic device via the control channel; and display the vitual key at the electronic device while the virtual key is to be displayed at the at least one other electronic device.

9. The electronic device of claim 8, wherein the controller is configured to add the virtual key to the first screen data displayed on the display if the signal for activating the virtual key is received.

10. The electronic device of claim 8, wherein the controller is configured to change a location of the virtual key if the control signal is a move signal for moving the virtual key.

11. The electronic device of claim 8, wherein the controller is configured to perform the function corresponding to a manipulation signal if the control signal is the manipulation signal.

12. The electronic device of claim 8, wherein the controller is configured to remove the virtual key if a control signal of the virtual key is not received during a threshold time.

13. The electronic device of claim 8, wherein the controller is configured to transmit an aspect ratio of a screen display of the electronic device to the at least one other electronic device.

14. A non-transitory computer-readable recording storage medium for storing one or more programs which, when executed by a processor, performs the method of claim 1.

15. The electronic device of claim 8, wherein upon receiving, from the at least one other electronic device, a request for changing a configuration of the virtual key, the controller is configured to transmit, to the at least one other electronic device via the communication circuitry, third screen data comprising changed virtual key.

* * * * *